US006694307B2

(12) United States Patent
Julien

(10) Patent No.: US 6,694,307 B2
(45) Date of Patent: Feb. 17, 2004

(54) SYSTEM FOR COLLECTING SPECIFIC INFORMATION FROM SEVERAL SOURCES OF UNSTRUCTURED DIGITIZED DATA

(75) Inventor: Benoit Julien, Verdun (CA)

(73) Assignee: Netvention, Montreal (CA)

( * ) Notice: Subject to any disclaimer, the term of this patent is extended or adjusted under 35 U.S.C. 154(b) by 157 days.

(21) Appl. No.: 09/800,562

(22) Filed: Mar. 7, 2001

(65) Prior Publication Data

US 2002/0129011 A1 Sep. 12, 2002

(51) Int. Cl.$^7$ ............................................. G06F 17/00
(52) U.S. Cl. ..................... 707/3; 707/4; 707/5; 707/6
(58) Field of Search ................... 707/1, 10, 200–206, 707/100–104.1

(56) References Cited

U.S. PATENT DOCUMENTS 5,696,962 A     12/1997  Kupiec
6,304,259 B1 * 10/2001  DeStefano ................... 707/101
6,424,976 B1 *  7/2002  Jarvis et al. ................. 707/201
6,574,628 B1 *  6/2003  Kahn et al. ..................... 707/10

OTHER PUBLICATIONS

Barbara et al., Interoperability with unstructured data and services, Research Issues in Data Engineering, 1993: Interoperability in Multidatabase Systems, 1993. Proceedings RIDE–IMS '93, Third International Workshop on, Apr. 19–20, 1993, pp. 123–125.*
Shen et al., Sweeping simplices: a fast iso–surface extractioni algorithm for unstructured grids, Visualization 1995, Proceedings, IEEE Conference on, Oct. 29–Nov. 3, 1995, pp. 143–150.*
Westermann et al., The VSBUFFER: visibility ordering of unstructured volume primitives by polygon drawing, Visulaization '97, Proceedings, Oct. 19–24, 1997, pp. 35–42.*
http://citeseer.nj.nec.com/embley00record.html.*
Web Mining for Buisness (an Intarka White Paper, Jan. 2000).
Recognizing Ontology–Applicable Multiple–Record Web Documents (http://wwww.deg.byu,edu/papers/signod01.pdf).
Extracting Information from Heterogeneous Information Sources Using Ontologically Specified Target Views (http://www.deg.byu.edu/paper/int.pdf).
Record Location and Reconfiguration in Unstructured Multple–Record Web Documents (http://www.deg.byu.edu/papers/WebDB00.ps.
Conceptual–Model–Based Data Extraction from Mulitple–Record Web Pages (http://www.deg.byu.edu/papers/dke99.pdf).
A Conceptual–Modeling Approach to Extracting Data from the Web (http://www.deg.byu.edu/papers/er98.pdf).
Ontology–Based Extraction and Structuring of Information from Data–Rich Unstructured Documents (http://www.deg-.byu.edu/papers/cikm98.pdf).
Fetch Technologies—Technology (http://www.fetch.com/technology.htm).
ItemField's Press Release: ItemFiled's Approcach to Information Extarctionadn Integration (http://itemfield.com/ItmFld–site/conten/white/pdf).

* cited by examiner

Primary Examiner—David Juy
(74) Attorney, Agent, or Firm—Schweitzer Cornman Gross & Bondell LLP

(57) ABSTRACT

A system for collecting specific information from several sources of unstructured digitized data. The system receives at least one instruction governing the collection of the specific information. The system includes a processing unit operative to analyze the contents of several sources of unstructured digitized data to identify therein information elements relevant to the specific information, at least in part on the basis of the received instruction(s). The processing unit extracts the identified information elements from each source of unstructured digitized data where information elements have been identified, and processes the extracted information elements for generating an output signal conveying the specific information.

53 Claims, 5 Drawing Sheets

SYSTEM FOR COLLECTING SPECIFIC INFORMATION FROM SEVERAL SOURCES OF UNSTRUCTURED DIGITIZED DATA

FIELD OF THE INVENTION

The present invention relates to the field of data extraction, more specifically to a system for collecting specific information from several sources of unstructured data. In a practical application, the invention may be used to extract specific information, such as business-related information, from the multiple pages of the World Wide Web (WWW).

BACKGROUND OF THE INVENTION

With over one and a half billion pages, the WWW is one of the largest sources of information on the planet. Whether searching for corporate, educational, historical, social, current affairs, geographical or general-knowledge information, among many other types, the WWW offers the richest, most up-to-date bank of information in existence.

Unfortunately, the WWW boasts an extremely vast and unstructured content, through which navigation may be difficult and even unsuccessful. In order to find and extract a few specific and relevant pieces of information, a Web user may have to personally search through many Web pages and immense quantities of disorganised information. This exhaustive searching of the WWW consumes an excessive amount of time and is oftentimes very frustrating for the Web user.

Present day technology provides to the Web user the capability to search the WWW for specific information, using a search engine to identify its probably location. However, once potential Web pages are found, the pages have to be thoroughly visited by the Web user in order to find and extract the relevant information, with no guarantee that the required information is even present in the potential Web pages. Further, where a structured compilation of the specific information is required, the Web user must personally create this compilation by identifying, extracting and formatting the relevant information from the WWW.

One system that is currently used for collecting specific information from the WWW involves the use of dedicated databases containing specific information, where the information contained in each dedicated database is associated with pages of the WWW, in a simplified example through cross-referencing. These dedicated databases are created and maintained by a human operator, for use by the system, and require constant maintenance and updating. Once a search of the WWW has identified possible relevant Web pages, the system accesses the appropriate database, determines the information contained therein that corresponds to the relevant Web pages and generates therefrom a structured compilation of the requested information. In a particular example, assume that the specific information being searched for is contact information for a particular company, a search of the WWW having identified several potentially relevant Web pages. In this case, the system accesses a dedicated database containing commercial information, including contact information, on various corporate entities and extracts therefrom the required contact information, on the basis of the Web pages revealed by the search.

Unfortunately, this system has many disadvantages. In particular, the specific information provided to the Web user in the structured compilation is only as up-to-date as the last time the dedicated database from which the specific information was taken was updated, and may lack information newly available on the WWW. Another, and greater, disadvantage is the need for human resources to create and continuously update the dedicated databases, as well as the potential for incorrect information stored in the dedicated databases due to human error. Finally, while certain specific information may be unpublished (unavailable) on the WWW but available elsewhere, such as in a private Intranet or in a set of data files on a workstation, the system is specifically designed to work only with the pages of the WWW.

The background information provided above clearly indicates that there exists a need in the industry to provide a novel system for extracting and structurally compiling specific information from unstructured digitized data, such as the Web pages of the WWW.

SUMMARY OF THE INVENTION

Under a broad aspect, the invention provides a system for collecting specific information from several sources of unstructured digitized data. The system has an input for receiving at least one instruction governing the collection of the specific information. In a specific, non-limiting example of implementation, the system receives an instruction conveying the location(s) where the collection is to take place. The system includes a processing unit that connects to a plurality of sources of unstructured digitized data from which the specific information is to be collected, at least in part on the basis of the instruction(s) received at the input. The processing unit is operative to analyse the contents of each source of unstructured digitized data to identify in each source the information elements relevant to the specific information. The processing unit extracts the identified information elements from each source of unstructured digitized data where information elements relevant to the specific information have been identified, and processes the extracted information elements for generating an output signal containing the specific information. The system further includes an output for releasing the output signal.

The advantages of this system are twofold. First of all, the sources of unstructured digitized data do not have to be personally searched in their entirety by a human operator in order to collect the specific information. Rather, the system analyzes the contents of each source of unstructured digitized data and automatically extracts therefrom the requested specific information. Secondly, the specific information collected by the system is the most up-to-date information available from the particular source(s) of unstructured digitized data where originated the specific information, since the specific information is taken directly from the particular source(s) of unstructured digitized data.

In this specification, the term "source" in the expression "source of unstructured digitized data" refers to a broad category of facilities containing, storing or providing digitized data, including databases, servers, memory modules, text files, digitized documents, among other possibilities. The sources of unstructured digitized data may be of different, even incompatible, data formats.

In this specification, the term "unstructured" in the expression "source of unstructured digitized data" is defined with respect to the information being searched for in the source of digitized data, from the point of view of the searcher. More specifically, the searcher is unaware of any particular layout or structure organizing the information contained in the digitized data. Further, several sources of unstructured digitized data are considered to be "unstructured" since they share no common structure or layout for the information contained therein.

In a specific non-limiting example of implementation, the unstructured digitized data is the data contained in the many pages of the WWW and the specific information is business-related information, in particular sales lead information for prospective clients. Such sales lead information, also referred to herein as contact information, may include the business name, the postal address, the e-mail address, the telephone and fax numbers, the name and title of a contact person, the number of employees, etc. The system is software implemented and resides on a computing device, such as a server or a workstation. For the purposes of this specific example, the system resides on a workstation at which a system user can access and use the system. In particular, the processing unit includes an identification unit having an input for receiving at least one instruction that governs the collection of the contact information. In this specific example, the identification unit receives from the system user an instruction conveying the location of a remote WWW site, in the form of a machine-readable URL (Universal Resource Locator) address, where the collection of the contact information is to take place. The unstructured digitized data to be searched is the data contained in the various Web pages connected to the URL address.

The identification unit is operative to establish a data connection with the Web site located at the URL address, from which starting point the identification unit can connect to the various Web pages connected to the URL address and import all of the unstructured digitized data contained therein. The identification unit is then operative to examine the data contained in each Web page connected to the URL address and to identify therein any information elements relevant to contact information, such as a telephone number, an e-mail address, a postal code, a name of a city, etc.

In a variant, the identification unit is operative to determine the particular Web pages connected to the URL address that are most likely to contain contact information. The identification unit will then examine only those particular Web pages in order to identify therein any relevant information elements, ignoring the other Web pages connected to the URL address. In a specific example, assume the URL address corresponds to the home or welcome page for a Web site. The identification unit first examines the home or welcome page in order to detect therein the various hyperlinks linking it to other, related Web pages. Assuming these hyperlinks are entitled: "Products", "History", "Contacts", "Address" and "Innovations", the identification unit may determine that the most likely pages to contain contact information are those linked to the "Contacts" and "Address" hyperlinks. The identification unit will then examine only the Web pages linked to the "Contacts" and "Address" hyperlinks for identifying relevant information elements, ignoring all of the other Web pages.

The processing unit also includes an extractor unit for extracting from the Web pages the information elements identified by the identification unit, as well as an aggregator unit for processing the extracted information elements for generating an output signal containing the contact information requested by the system user. In this specific example, the output signal includes a structured compilation, such as a list or a table, of all of the retrieved contact information, where this output signal is transmitted to the system user by display on the monitor of the workstation.

The identification unit relies on lexical analysis operations that are well known to persons skilled in the art, as well as on text interpretation rules, to identify and categorise the information elements relevant to the specific information, in this example sales lead information. The lexical analysis performed by the identification unit relies on one or many dictionaries. In a specific example, a first dictionary contains all the names of major cities of the world, a second dictionary contains all the names of major provinces and states of the world and a third dictionary contains all the names of major countries of the world. Possible categories for the identified information elements may include name of a city, name of a province or state, name of a country, telephone or fax number, e-mail address, street name, postal code, etc.

The text interpretation rules are based on "regular expressions", used to express and process different text patterns. The concept of "regular expressions" is well known to those skilled in the art and, as such, will not be described in further detail. Different regular expression processing tools, such as OROmatcher (trade-mark), can be used by the identification unit for interpreting the data of the Web pages in order to identify therein and categorise information elements relevant to the requested specific information. Note that different types of text interpretation systems could also be used by the identification unit, without departing from the scope of the present invention.

The aggregator unit relies on pre-determined clustering rules to correlate and establish relationships between the information elements identified in each Web page. Thus, for a particular Web page, the aggregator unit processes the information elements identified therein and, on the basis of distance between the identified information elements on the page and the different categories of the identified information elements, relates the identified information elements for compiling complete or incomplete contact information. Once the contact information for each Web page has been compiled, the aggregator unit is operative to aggregate the contact information compiled from each Web page on a page by page basis, as well for the totality of the Web pages, in order to remove any similar or repetitive contact information. The aggregator unit is also capable to combine, if appropriate, incomplete contact information from a particular Web page with complementary incomplete contact information from a different Web page.

In a different example of implementation, the system includes a prospector unit that cooperates with at least one search engine and acts as an interface between the system and a user of the system. The prospector unit prompts the system user for at least one key word, based on which the prospector unit formulates to the search engine a search query in order to prospect for contact information of potential clients available over the WWW. For example, assume a software publisher provides to the prospector unit the key words "software distributors". On the basis if these key words, the prospector unit formulates a search query to the search engine, which searches the WWW for relevant Web sites/pages. The search results are returned by the search engine to the prospector unit, which is operative to feed the URL address of each relevant Web page returned by the search engine to the identification unit of the system. Next, the information elements relevant to contact information are identified in each Web page, extracted and compiled into contact information, as defined above.

In a variant, the prospector unit is capable to select, on the basis of the key word(s) input by the system user, one or more specific Web pages from the plurality of pages returned by the search engine, passing only the URL address(es) for the selected specific Web page(s) to the identification unit of the system. In a specific example, the system user inputs to the prospector unit the name of a company, based on which the prospector unit formulates a search query to the search engine. The search engine searches the WWW for pages containing or making reference to the name of the company, and returns to the prospector unit a plurality of potentially relevant Web pages/sites. The prospector unit is operative to select from the plurality of potentially relevant Web pages/sites returned by the search engine the particular Web page that constitutes the home page for the named company, if present. The prospector unit next discards all of the other Web pages/sites and feeds to the identification unit of the system only the URL address corresponding to the home page of the named company, where collection of the contact information will then take place, as described above. In another aspect, the invention provides a computer readable storage medium containing a program element for execution by a computing apparatus to implement a system for collecting specific information from several sources of unstructured digitized data.

In yet another aspect, the invention provides a data processing device for collecting specific information from several sources of unstructured digitized data, having an input for receiving at least one instruction governing the collection of the specific information. The data processing device includes an identification unit operative to connect to a plurality of sources of unstructured digitized data from which the specific information is to be collected, at least in part on the basis of the at least one instruction. The identification unit examines each source of unstructured digitized data in order to identify information elements relevant to the specific information. The data processing unit also includes an extractor unit for extracting the identified information elements from each source of unstructured digitized data in which data elements were identified, and an aggregator unit operative to process the extracted information elements for generating an output signal containing the specific information. The data processing device includes an output for releasing the output signal from the data processing device.

The invention further provides a method for collecting specific information from several sources of unstructured digitized data.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
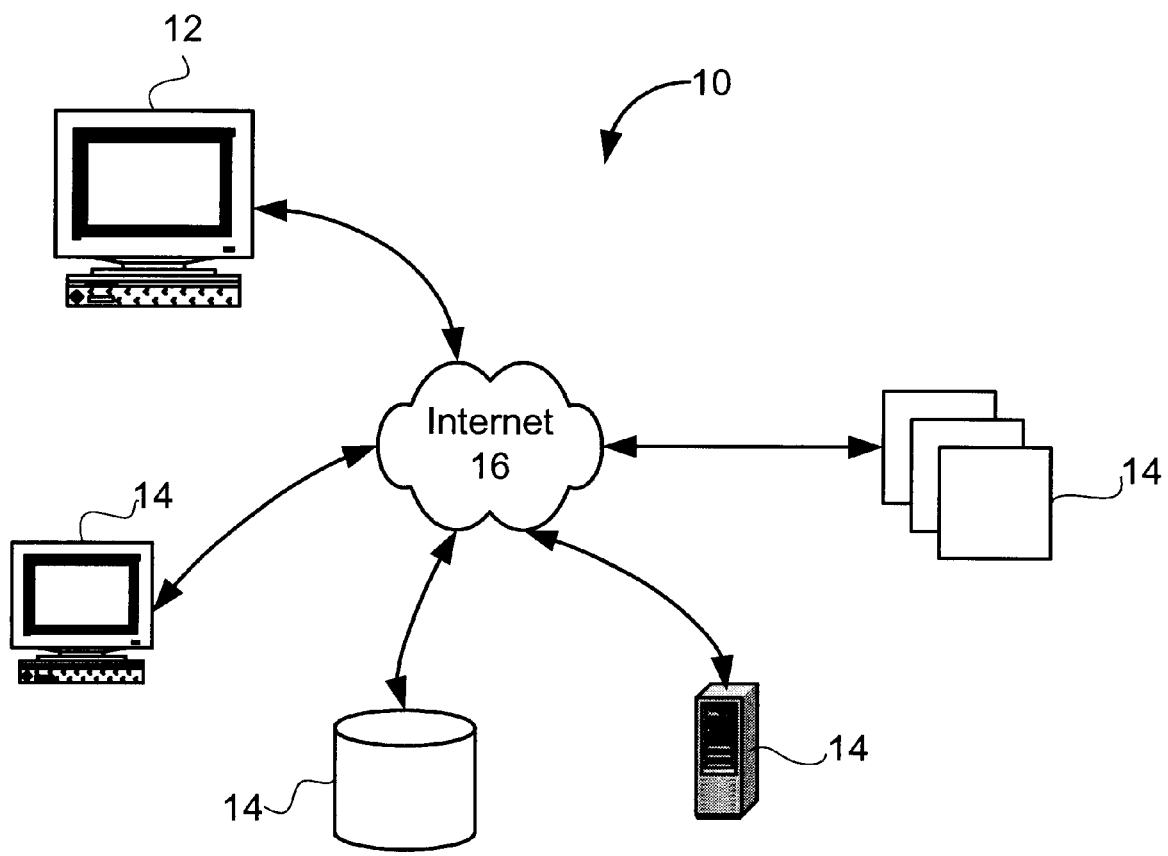
FIG. 1 is a block diagram of a typical network arrangement using the Internet.

FIG. 1 illustrates a typical network arrangement 10 comprising a user workstation 12 that is connected to several WWW data sources 14 via the world wide packet data communication network 16, commonly referred to as the Internet 16. These WWW data sources 14 support or are linked to sites/pages of the World Wide Web and may have different, even incompatible, formats, for example database, server, workstation, text file or digitized document, among many other types of facilities containing, storing or providing digitized data. Applications on the workstation 12, such as a Web browser application, permit a user to communicate with the WWW data sources 14 through the Internet 16, where the types of data available to the user over the Internet 16 include textual, graphical and audio data, among other possibilities.

Figure 2:
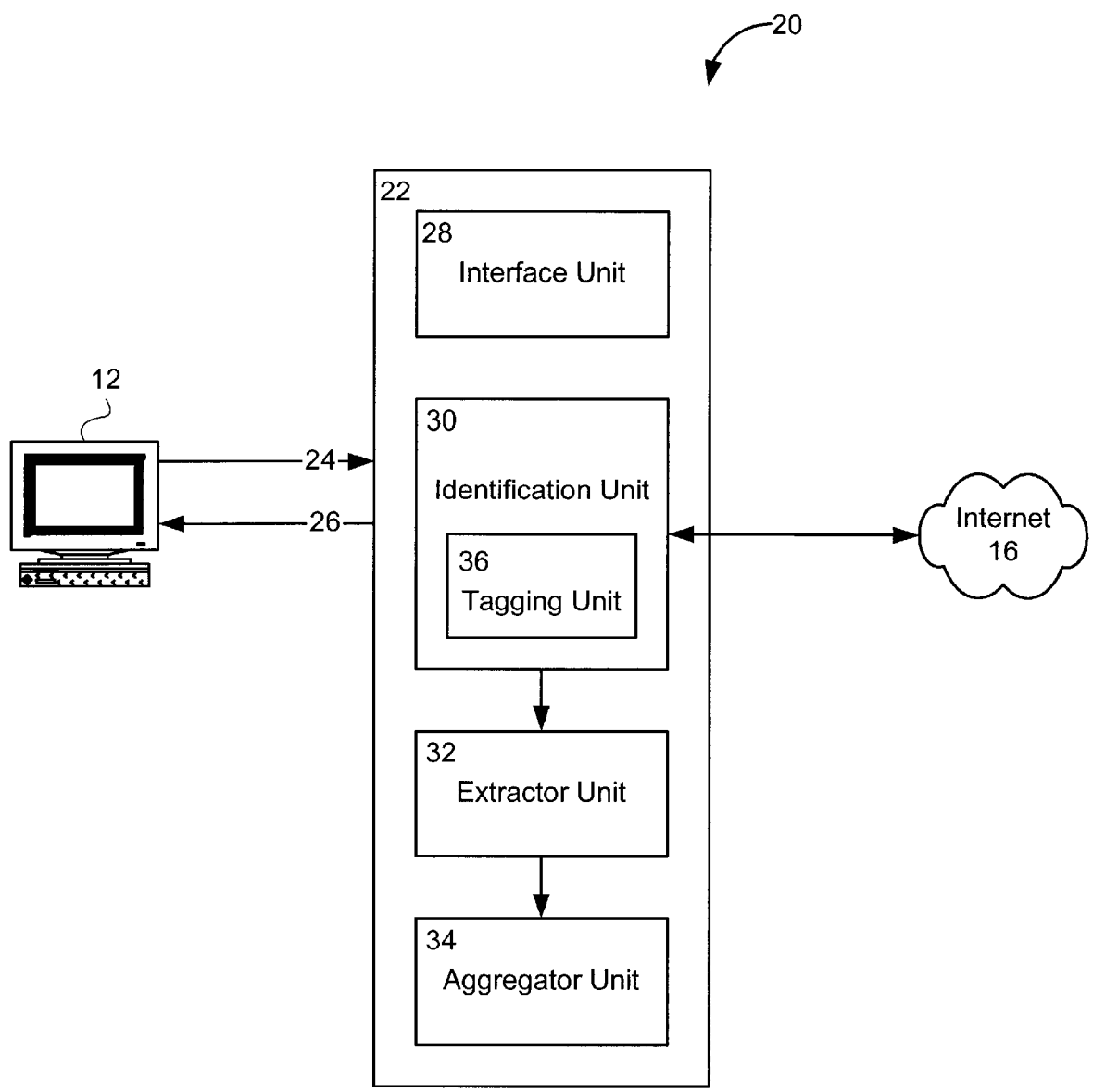
FIG. 2 is a functional block diagram of a system for collecting specific information from several sources of unstructured digitized data, according to a specific example of implementation of the present invention.

FIG. 2 illustrates a functional block diagram of a system for collecting specific information from several sources of unstructured digitized data, in accordance with a specific, non-limiting example of implementation of the present invention. The system identified by the reference numeral 20 includes a processing unit 22 having an input 24 and an output 26. The input 24 receives from the workstation 12 an input signal conveying at least one instruction governing the collection of the specific information. The instruction(s) may include the location where the collection is to take place, the nature of the specific information to be collected, a key word based on which the specific information is to be collected, among other possibilities.

In this particular example of implementation, the system 20 collects business-related information, in particular sales lead information (also referred to herein as contact information) for potential clients, from the many pages of the WWW accessible via the Internet 16. A system user provides URL address(es) to the system 20 at workstation 12, in response to a prompt from the system 20, from which the contact information is to be collected. The system 20 thus receives at input 24 an input signal conveying the location, in the form of at least one URL address, where the collection of contact information is to take place, each Web page connected to the URL address(es) being a source of unstructured digitized data that potentially contains contact information. The output 26 releases an output signal conveying the collected contact information to the workstation 12, for display on a monitor to the system user.

Note that, in an alternative example, the system 20 could collect patent portfolio information from a set of machine-readable data storage facilities storing a plurality of digitized patent documents. Although the machine-readable storage facilities could be the on-line patent databases of one or more Patent Offices, these may also be off-line facilities (not connected to the Internet 16). Thus, the system 12 may collect any type of digitized specific information from any source of unstructured digitized data, and is not limited to use with the WWW.

The processing unit 22 includes an interface unit 28 that permits the system 20 to retrieve from the user the instruction(s) governing the collection of the specific information, as well as to transmit to the user the collected contact information. Under this specific example of implementation, the interface unit 28 creates Graphical User Interfaces (GUIs), in the form of data capture dialog boxes and/or data display screens, on the monitor of the workstation 12. In the case of data capture dialog boxes, the user is required to key in data, in this example the URL address where the collection of the contact information is to take place. Since the functionality and operation of such an interface unit 28 is well known to those skilled in the art, it will not be described in further detail.

The processing unit 22 also includes an identification unit 30, an extractor unit 32 and an aggregator unit 34. Together, these three units are operative to collect contact information from one or more pages of the WWW, at least in part on the basis of the specific instruction(s) received at input 24. In particular, once a URL address specifying the location where the collection is to take place has been received at input 24, the identification unit 30 establishes via the Internet 16 a data connection with the Web page located at this URL address. From this starting point, the identification unit 30 can access and import all of the unstructured digitized data contained in the various Web pages connected to the URL address. Note that the identification unit 30 may be operative to filter out certain types of unstructured digitized data from the Web page, for example coding comments and Java script, where these types of unstructured digitized data are recognised by the identification unit as not containing any contact information. Once imported, the identification unit 30 examines the data contained in each Web page connected to the URL address and identifies in each Web page any information elements relevant to contact information.

In operation, the identification unit 30 scans the imported data contained in each Web page connected to the URL address, processing the data from each Web page in turn. While scanning the data of a particular Web page, the identification unit 30 marks any information elements identified as being relevant to contact information. Examples of such relevant information elements include a business name, a business description, a postal code, an e-mail address, a telephone number and the name of a city or street, among many other possibilities.

Note that the analysis performed by the identification unit 30 may reveal that no information elements relevant to contact information are contained in any one of the various Web pages connected to the URL address provided by the system user.

In this particular example of implementation, the identification unit 30 includes a tagging unit 36 operative to mark the data of a particular Web page by inserting tags, in order to identify information elements. Each tag, in addition to identifying a particular information element, includes data indicative of a category for the identified information element, as will be described below. More specifically, when the identification unit 30 recognises in the data of a particular Web page an information element that is relevant to contact information, the tagging unit 36 inserts into the data of the Web page a machine-readable tag, such as digitized text or symbol(s). The tag is inserted at a predetermined position with respect to the identified information element, in one example immediately adjacent and preceding the information element. An example of such a tagging unit is the InfoTagger (trade-mark), manufactured by the Canadian National Research Council (CNRC) located in Ottawa, Canada.

Alternative methods of marking information elements in unstructured digitized data exist, and may be used by the identification unit 30 without departing from the scope of the present invention.

The identification unit 30 relies on lexical analysis operations that are well known to persons skilled in the art, as well as on text interpretation rules, to identify and categorise the information elements relevant to the specific information, in this example contact information. Possible categories for the identified information elements may include name of a city, name of a province or state, name of a country, telephone or fax number, e-mail address, street name, postal code, etc. The lexical analysis performed by the identification unit relies on one or many dictionaries. In a specific example, a first dictionary contains all the names of major cities of the world, a second dictionary contains all the names of major provinces and states of the world and a third dictionary contains all the names of major countries of the world. The lexical analysis operation of the identification unit 30 may be capable to detect the language of the data contained in the Web pages, based on which the appropriate dictionary, or dictionaries, will be selected.

Note that, in this particular example of implementation, the lexical analysis operation of the identification unit 30 identifies from the Web pages data digitized in standard text form. Alternatively, the lexical analysis operation of the identification unit 30 may also recognise data digitized in graphic form.

The text interpretation rules are primarily, but not necessarily strictly, based on "regular expressions" that are used to express and process different text patterns. Since the concept of "regular expressions" is well known to those skilled in the art and is not critical to the present invention, it will not be described in further detail. Different regular expression processing tools, such as the commercially available OROmatcher (trade-mark), can be used by the identification unit 30 for interpreting the data of the Web pages in order to identify therein and categorise information elements relevant to the requested specific information. Note that different types of text interpretation systems may be used by the identification unit 30 without departing from the scope of the present invention.

The extractor unit 32 extracts from each Web page the information elements identified by the identification unit 30, where the identified information elements may reside in various areas of a particular Web page. The aggregator unit 34 processes the extracted information elements for generating an output signal containing the contact information requested by the system user. Note that, although shown functionally in FIG. 2 as a separate unit, the extractor unit 32 may be implemented by either one of the identification unit 30 and the aggregator unit 34. For example, the tagging operation performed by the tagging unit 36 of the identification unit 30 may involve extraction of the identified information elements, where the extracted information elements, including tags, are passed to the aggregator unit 34 for further processing. Alternatively, once the identification unit 30 has tagged the identified information elements in each Web page, control may pass directly to the aggregator unit 34 for extraction and processing of the tagged information elements from each Web page.

The aggregator unit 34 relies on pre-determined intelligent clustering rules to correlate and establish relationships between the information elements identified in each Web page. The aggregation process consists of establishing relations between identified information elements so as to build coherent specific information, in this example contact or sales lead information. In the specific case where information elements are identified in a Web page by means of tags, the intelligent clustering rules are based on:

a) the proximity of tags within the page; and
b) the requirements associated with each tag.

The proximity of tags is expressed as a relative or absolute metric distance, for example the number of words or lines, between a seed tag from which the aggregation process starts. For instance, the aggregation process may implement a metric distance of 50 words before and 100 words after a seed tag, within which distance other relevant tags can be gathered in relation to the seed tag. A clustering of contact information may consist of one or several seed tags and one or more predefined metric distance ranges.

The requirements of each tag within a cluster of contact information may vary. During the aggregation process, each time a tag requirement is exceeded or violated, the clustering stops in one or both directions from the seed tag. In a specific example, the tag requirements are specified with a minimum and maximum possible number of instances and an order. Thus, a triplet of digits may express the full range of requirements for each tag, for example:

(1, 1, 1)=there must be at least one, but no more than one, instance of this tag in the cluster and it must be first among the ordered tags (1, X, X)=there must be one or more instances of this tag in the cluster, in any order (0, 0, −1)=there can be no instance of this tag in the cluster (break tag)

(0, 1, X>1)=this is an optional tag and, if present in the cluster, it must be located after the tag with order 1

(0, 1, −1)=this is an optional tag and, if present in the cluster, it may be in any order Note that, in the above examples, X may be any integer. Taking for example an address, the following aggregation rule may apply:

Street Name=(1, 1, 1)

City=(1, 1, 2)

Region=(1, 1, 3)

Country=(0, 1, 4)

Postal Code=(0, 1, −1)

Thus, for a particular Web page, the aggregator unit 34 processes the information elements identified therein and, on the basis of distance between the identified information elements on the page and the different categories of the identified information elements, relates the identified information elements for compiling complete or incomplete contact information. For example, assume a first information element has been identified as being a telephone number and a second information element has been identified as being a name of a person. If the two information elements are within a certain distance of one another on the Web page, and no break information elements, such as the another person's name, are identified between the two information elements on the page, the aggregator unit 34 will relate the two information elements together. In another example, when an information element of a particular category has been identified on a Web page, such as a postal code, the aggregator unit 34 recognises that an identified information element located immediately adjacent or nearby the particular information element most likely relates to the particular information element.

Once the aggregator unit 34 has compiled the contact information for each Web page, the aggregator unit 34 is operative to aggregate together all of the compiled contact information, on a page by page basis as well as for the totality of the Web pages, in order to remove any similar or repetitive contact information. The aggregator unit 34 is also capable to combine, if possible, incomplete contact information from a particular Web page with complementary incomplete contact information from a different Web page. The aggregator unit 34 next generates an output signal including a structured compilation, such as a list or a table, of the retrieved contact information, where this output signal is transmitted via output 26 to the system user for display on the monitor of the workstation 12.

Assuming the structured compilation generated by the aggregator unit 34 is a list of contact information, the aggregator unit 34 compiles the information elements extracted from each Web page into a list of complete or partially complete contact information. Once a list of contact information has been generated for each Web page, the aggregator unit 34 processes the set of lists, removing any redundant contact information and completing, if possible, any partial contact information, for generating a final list containing all of the identified contact information. This final list is returned in the output signal to the system user.

Since the lexical analysis operations used by the identification unit 30 are well known to those skilled in the art and have been well documented, they will not be described in further detail.

Figure 3:
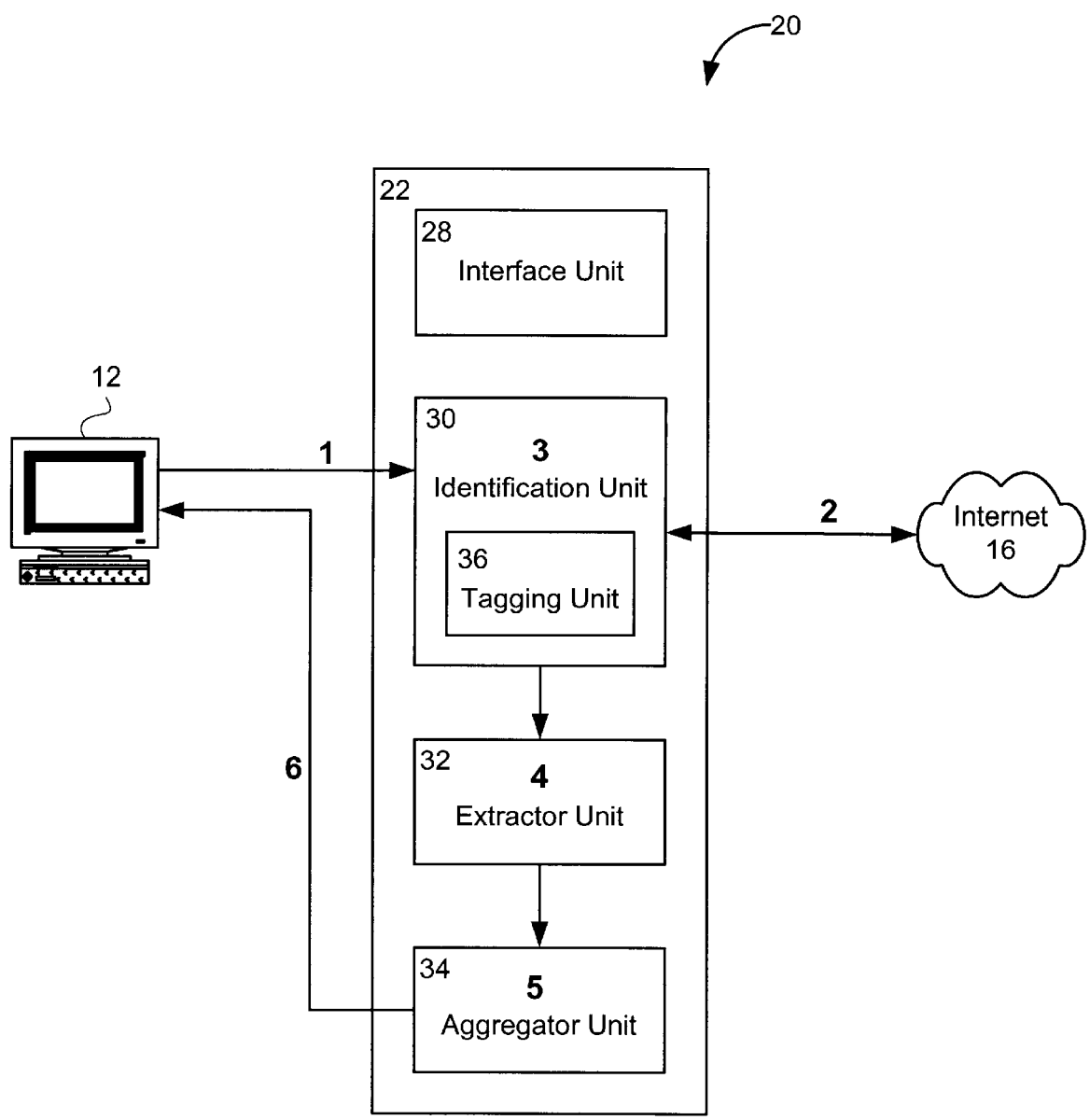
FIG. 3 is a diagram that illustrates the events occurring when a request for specific information is input to the system shown in FIG. 1.

The following detailed example illustrates the events that take place when a search for contact information is initiated by a user from the workstation 12, with the system 20 of the present invention resident. FIG. 3 shows the sequence of events that start with the user initiating a search. This step is labeled 1 in FIG. 3 and the final step, when the system 20 has finished processing the request, is labeled step 6.

1. The user submits to the system 20 a URL address, via a data capture dialog box displayed on the monitor of the workstation 12 by the interface unit 28.

2. The identification unit 30 establishes via the Internet 16 a data connection with the Web page located at the submitted URL address, and accesses and imports all of the unstructured digitized data contained in the various Web pages connected to the URL address.

3. The identification unit 30 examines the data contained in each Web page connected to the URL address and identifies and tags in each Web page any information elements relevant to contact information, such as a telephone number, an e-mail address, a postal code, a name of a city, etc. Once all of the Web pages have been examined, the identification unit 30 passes control to the extractor unit 32.

4. The extractor unit 32 extracts from each Web page the information elements identified therein by the identification unit 30, and passes control to the aggregator unit 34.

5. The aggregator unit 34 processes the extracted information elements in order to correlate and establish relationships between the information elements identified in each Web page, thus compiling an aggregated list of contact information for each Web page. The aggregator unit next combines the set of aggregated lists into a final, structured list containing the requested contact information, removing any similar contact information and combining any complementary contact information.

6. The aggregator unit 34 transmits the final list containing the requested contact information to the system user, displayed to the system user in a data display screen on the monitor of the workstation 12

Figure 4:
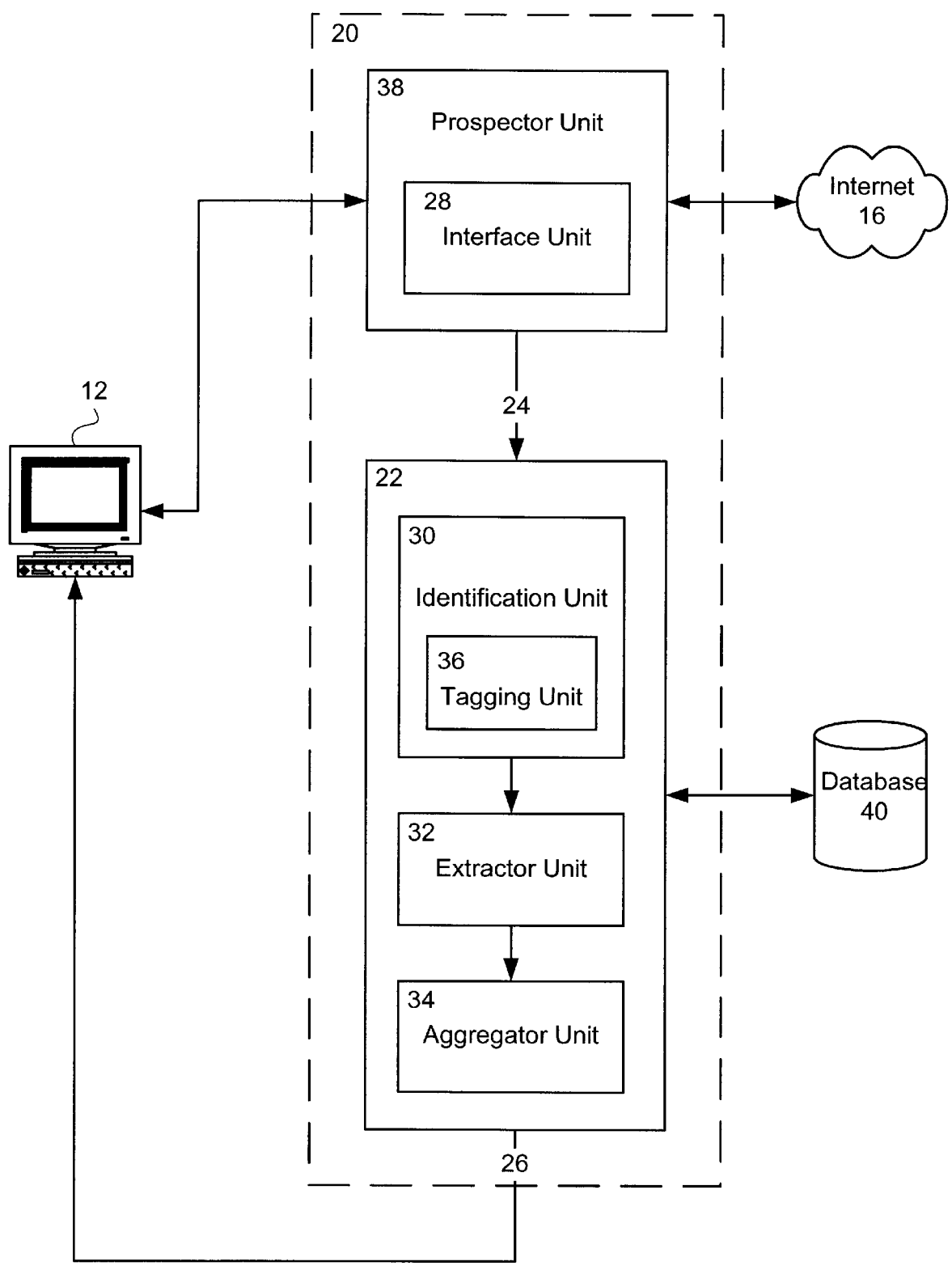
FIG. 4 is a functional block diagram of a system for collecting specific information from several sources of unstructured digitized data, according to a different specific example of implementation.

In an alternative example of implementation, the system 20 includes a prospector unit 38 and a database 40, as shown in FIG. 4. The prospector unit 38 cooperates with at least one search engine that is operative to search the Internet 16 for information on the basis of formulated search queries, acting as an interface between the system 20 and a user of the system 20. In this example of implementation, the interface unit 28 is implemented by the prospector unit 38, whereby the prospector unit 38 can communicate with the system user at the workstation 12. In operation, the prospector unit 38 prompts the system user for at least one key word, based on which the prospector unit 38 formulates to the search engine a search query in order to prospect for contact information of potential clients available over the WWW. For example, assume the system user is a software publisher interested in obtaining from the WWW a list of contact information for potential clients. The software publisher will provide to the prospector unit 38 the key words "software distributors", on the basis of which the prospector unit 38 formulates a search query to the search engine, which searches the WWW for relevant Web sites/pages.

The search results are returned by the search engine to the prospector unit 38, which is operative to feed the URL address of each relevant Web page returned by the search engine to the identification unit 30 of the system 20. Next, the information elements relevant to contact information are identified in each Web page, extracted and compiled into contact information, as defined above. The output signal containing the requested contact information, generated by the aggregator unit 34, is transmitted to the system user at the workstation 12 via output 26 as well as to the database 40, where the retrieved contact information is automatically stored.

Note that, although shown as a separate functional unit in FIG. 4, the prospector unit 38 may be implemented by the processing unit 22.

The database 40 is a computer readable storage medium that is read from and written to by the processing unit 22 of the system 20. When the processing unit 22 stores contact information in the database 40, this contact information is mapped to the URL address(es) of the Web page(s) from which the contact information was retrieved. Further, the storage operation of contact information in the database 40 may include time-stamping of the contact information by the processing unit 22, for example appending to the contact information the date on which the contact information was retrieved from the WWW and stored in the database 40. Thus, tracking of the contact information stored in the database 40 by the processing unit 22 would be possible, for determining the amount of time that has expired since the stored contact information was last updated.

In a variant, the prospector unit 38 is capable to select, on the basis of the key word(s) input by the system user, one or more specific Web pages from the plurality of pages returned by the search engine, passing only the URL address(es) for the selected specific Web page(s) to the identification unit 30 of the system 20. For example, assume the system user inputs to the prospector unit 38 the name of a company, based on which the prospector unit 38 formulates a search query to the search engine. The search engine searches the WWW for pages containing or making reference to the name of the company, and returns to the prospector unit 38 a plurality of potentially relevant Web pages/sites. The prospector unit 38 is operative to select from the plurality of potentially relevant Web pages/sites returned by the search engine the particular Web page that constitutes the home page for the named company, if present. The prospector unit 38 next discards all of the other Web pages/sites returned by the search engine and feeds to the identification unit 30 only the URL address corresponding to the home page of the named company, where collection of the contact information will take place.

In order to select from the plurality of potentially relevant Web pages/sites returned by the search engine the particular Web page that constitutes the home page for the named company, the prospector unit 38 performs a search of the potentially relevant Web pages/sites on the basis of the company name and then assess the relevance of each Web page returned by the search. The relevance of each Web page is assessed using a scoring system that permits to evaluate various criteria. Examples of such criteria include the degree of match between the company name and the URL address of the Web page, as well as whether the company name appears in the Web page title and summary description. The prospector unit 38 may also, if necessary, proceed to validate the most relevant Web pages by performing on these Web pages the above-described identification and extraction operations in order to match the extracted information elements with key words provided by the system user, for example a business name, a phone number, a postal code, etc.

One possible application of the ability of the prospector unit 38 to select, on the basis of key word(s) input by the system user, one or more specific Web pages from a plurality of pages returned by the search engine, is the performance of business data maintenance. Thus, the system 20 may be used to maintain and update a remote business database on the basis of business records submitted to the system 20 by a user, where a business record includes a list of businesses for which contact information is required. The prospector unit 38 can update the contact information for each business name appearing in the list either by obtaining the updated contact information directly from the database 40, if itself updated, or by finding and connecting to the home page for each business for collecting therefrom the updated contact information. In the latter case, the prospector unit 38 passes control to the identification unit 30 such that the above-described identification, extraction and aggregation operations take place, in order to acquire the updated contact information from the home page, which is then returned to the remote business database for storage.

In another variant, when the identification unit 30 receives from the prospector unit 38 one or more URL addresses corresponding to Web pages from which contact information is to be retrieved, the identification unit 30 is first operative to determine the particular Web pages connected to the one or more URL addresses that are most likely to contain contact information. The identification unit 30 will then examine only those particular Web pages in order to identify therein any relevant information elements, ignoring the other Web pages connected to the URL address(es). In a specific example, assume the prospector unit 38 passes only one URL address to the identification unit 30, where this URL address corresponds to the home or welcome page for a Web site. The identification unit 30 first examines the home or welcome page using lexical analysis operations and text interpretation rules, and detects therein the various hyperlinks linking it to other, related Web pages. Assuming these hyperlinks are entitled: "Products", "History", "Contacts", "Address" and "Innovations", the identification unit 30 may determine that the most likely pages to contain contact information are those linked to the "Contacts" and "Address" hyperlinks. The identification unit 30 will then examine only the Web pages linked to the "Contacts" and "Address" hyperlinks for identifying relevant information elements, ignoring all of the other Web pages. Note that the determination of the particular Web pages connected to the URL address(es) to be examined by the identification unit 30 may vary according to the specific information to be retrieved, in this example contact information.

In yet another variant, upon receiving one or more URL addresses from the prospector unit 38, the processing unit 22 will first consult the database 40, in order to determine if contact information from the Web page(s) connected to the URL address(es) has previously been extracted and stored. If contact information is already mapped to the URL address (es) in the database 40, the processing unit 22 will check the time-stamp associated with the stored contact information. If the time-stamp indicates that the stored contact information has been stored for less than a predetermined amount of time, for example three months, the processing unit 22 will retrieve the contact information stored in the database 40 and will generate therewith the output signal to be sent back to the system user at workstation 12, bypassing the previously described identification, extraction and aggregation operations. If the time-stamp indicates that the stored contact information has been stored for more than the predetermined amount of time, the processing unit 22 may pass control to the identification unit 30, whereby the above-described identification, extraction and aggregation operations are performed by the system 20. Thus, the system user will receive updated contact information, retrieved directly from the Web page(s) connected to the URL address(es) provided by the prospector unit 38, and the contact information stored in the database 40 for the Web page(s) connected to the URL address(es) will be updated.

Note that the processing unit 22 may automatically update the database 40 at regular intervals, for example daily, weekly or monthly. Specifically, the processing unit 22 will regularly pass control to the identification unit 30, whereby the above-described identification, extraction and aggregation operations are performed by the system 20, in order to acquire updated contact information for the Web page(s) associated with each URL address stored in the database 40. In this scenario, upon receiving one or more URL addresses from the prospector unit 38, the processing unit 22 will only search the database 40 for the requested contact information, as the latter will always be sufficiently up-to-date.

Figure 5:
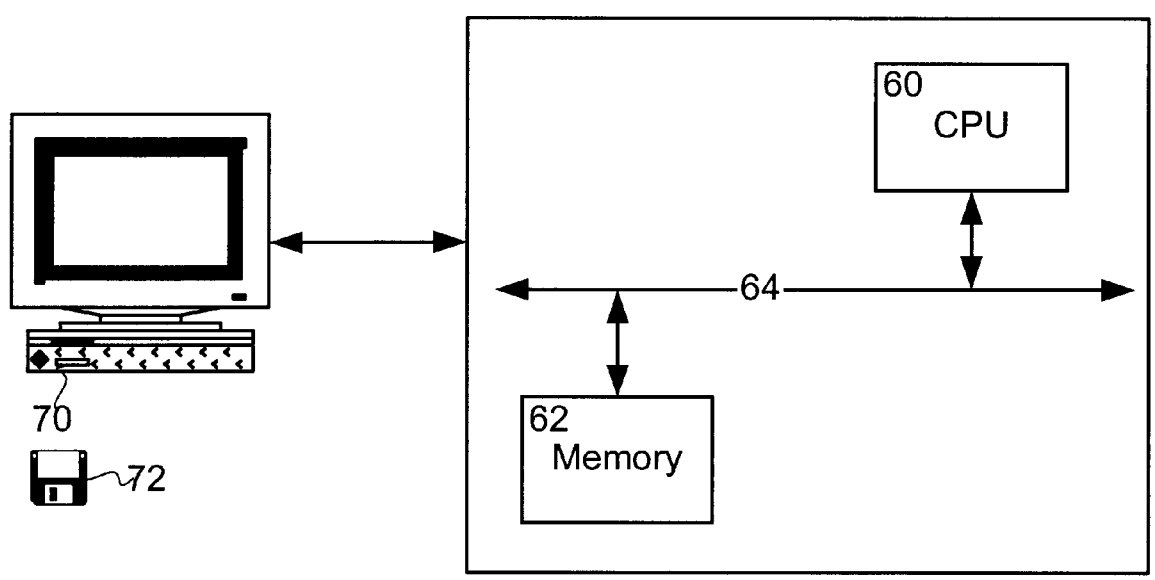
FIG. 5 is a block diagram of a computing device forming a suitable platform for the software implementation of the system shown in FIGS. 2 and 4, in accordance with an example of implementation of the present invention.

The processing unit 22 and prospector unit 38 of the system 20 are software implemented on a computing platform, such as the workstation 12. The basic structure of the computing device constituting the workstation 20 is depicted in FIG. 5. The computing device has a Central Processing Unit (CPU) 60, a memory 62 and a bus 64 connecting the CPU 60 to the memory 62. The memory 62 holds program instructions for execution by the CPU 60 to implement the functionality of the system for collecting specific information from several sources of unstructured digitized data. The system may be stored on a computer readable medium 70, such as a floppy disk, that is external to the computing device. The floppy disk 70 can be read by a floppy drive 72 to load the program instructions in the memory 62. The computer readable medium 70 may be part of a remote computing platform that is in some way connected to the computing platform that executes the program element for allowing the data transfer necessary to pass the program element to the computing platform on which the execution will take place. For example, a file server containing the program element that can be accessed over any suitable connection by another computing platform to obtain the program element is considered a computer readable medium storing the program element.

Although various embodiments have been illustrated, this was for the purpose of describing, but not limiting, the invention. Various modifications will become apparent to those skilled in the art and are within the scope of this invention, which is defined more particularly by the attached claims.

I claim:

1. A system for collecting specific information from several sources of unstructured digitized data, said system comprising:

a) an input for receiving at least one instruction governing the collection of the specific information;

b) a processing unit coupled to said input, said processing unit operative to:

i) establish a data connection with a plurality of sources of unstructured digitized data from which the specific information is to be collected, at least in part on the basis of the at least one instruction;

ii) analyse the contents of each one of said plurality of sources of unstructured digitized data to identify information elements relevant to the specific information;

iii) extract the identified information elements from each source of unstructured digitized data where information elements have been identified;

iv) process the extracted information elements for generating an output signal conveying at least a portion of the specific information, said processing including:

for each source of unstructured digitized data, correlating the information elements extracted therefrom on the basis of predetermined clustering rules for assembling the extracted information elements into coherent information relevant to the specific information;

compiling the coherent information assembled from the plurality of sources of unstructured digitized data into said at least a portion of the specific information; and discarding redundant information from said at least a portion of the specific information;

c) an output coupled to said processing unit for releasing said output signal from said system.

2. A system as defined in claim 1, wherein said at least one instruction conveys at least one location where the collection of the specific information is to take place.

3. A system as defined in claim 2, wherein said at least one instruction conveys at least one URL address indicating the address of a source of unstructured digitized data, each URL address being in a form such that said processing unit can access the source and import the unstructured digitized data from the source.

4. A system as defined in claim 3, wherein said plurality of sources of unstructured digitized data are pages of the World Wide Web (WWW), each URL address indicating the address of a page of the WWW potentially including at least one connection to a different page of the WWW.

5. A system as defined in claim 4, wherein said system further includes a prospector unit coupled to said input, said prospector unit in data communication with at least one search engine capable to search the WWW on the basis of query requests formulated by said prospector unit.

6. A system as defined in claim 5, wherein said prospector unit receives at least one search parameter from a user, said prospector operative to:

a) generate a query request on the basis of the at least one search parameter;

b) send the query request to the search engine;

c) receive a response to the query request from the search engine including at least one URL address indicating the address of a WWW page containing information related to the at least one search parameter;

d) process the response and generate an instruction including the at least one URL address returned by the search engine;

e) transmit said instruction to said input of said system.

7. A system as defined in claim 6, wherein said processing unit is responsive to the instruction received from said prospector unit for extracting therefrom the at least one URL address returned by the search engine, said processing operative to collect the specific information from the WWW pages connected to the at least one URL address returned by the search engine.

8. A system as defined in claim 6, wherein said prospector unit receives a response to the query request from the search engine including a plurality of URL addresses, each URL address indicating the address of a WWW page containing information related to the at least one search parameter, said prospector unit being further operative to:
 a) select a particular URL address from said plurality of URL addresses returned by the search engine on the basis of said at least one search parameter;
 b) discard the unselected URL addresses;
 c) generate an instruction including the selected URL address;
 d) transmit said instruction to said input of said system.

9. A system as defined in claim 8, wherein the specific information is business information.

10. A system as defined in claim 9, wherein the at least one search parameter is the name of a company.

11. A system as defined in claim 10, wherein the selected URL address indicates the address of the home page for the company.

12. A system as defined in claim 3, wherein said processing unit performs lexical analysis and text interpretation operations for identifying information elements relevant to the specific information in each source of unstructured digitized data.

13. A system as defined in claim 12, wherein the lexical analysis and text interpretation operations are performed by said processing unit at least in part on the basis of a plurality of dictionaries.

14. A system as defined in claim 12, wherein, for each source of unstructured digitized data where information elements have been identified, said processing unit is operative to establish relationships between the identified information elements at least in part on the basis of predetermined clustering rules, for assembling the identified information elements into coherent information relevant to the specific information.

15. A system as defined in claim 14, wherein said processing unit is operative to process said coherent information generated from all of the sources of unstructured digitized data in which information elements relevant to the specific information were identified, for removing repetitive information and combining complementary information.

16. A system as defined in claim 1, wherein said processing unit generates a data structure holding the specific information, said output signal including the data structure.

17. A system as defined in claim 16, wherein said data structure is a list.

18. A system as defined in claim 16, wherein said data structure is a table.

19. A system as defined in claim 1, wherein each source of unstructured digitized data is selected from the group consisting of a WWW page, a database, a server, a memory module, a text file and a digitized document.

20. A system as defined in claim 1, wherein the specific information is business information.

21. A system as defined in claim 20, wherein the specific information is contact information for prospecting potential clients.

22. A system as defined in claim 21, wherein the information elements relevant to the contact information are selected from the group consisting of business name, business description, telephone number, fax number, postal address, street name, city, country, region, postal code, e-mail address, name of a contact person and title of a contact person.

23. A computer readable storage medium containing a program element for execution by a computing apparatus to implement a system for collecting specific information from several sources of unstructured digitized data, said system including:
 a) an input for receiving at least one instruction governing the collection of the specific information;
 b) a processing unit coupled to said input, said processing unit operative to:
  i) establish a data connection with a plurality of sources of unstructured digitized data from which the specific information is to be collected, at least in part on the basis of the at least one instruction;
  ii) analyse the contents of each one of said plurality of sources of unstructured digitized data to identify information elements relevant to the specific information;
  iii) extract the identified information elements from each source of unstructured digitized data where information elements have been identified;
  iv) process the extracted information elements for generating an output signal conveying at least a portion of the specific information, said processing including:
   for each source of unstructured digitized data, correlating the information elements extracted therefrom on the basis of predetermined clustering rules for assembling the extracted information elements into coherent information relevant to the specific information;
   compiling the coherent information assembled from the plurality of sources of unstructured digitized data into said at least a portion of the specific information; and
   discarding redundant information from said at least a portion of the specific information;
 c) an output coupled to said processing unit for releasing said output signal from said system.

24. A computer readable storage medium as defined in claim 23, wherein said at least one instruction conveys at least one location where the collection of the specific information is to take place.

25. A computer readable storage medium as defined in claim 24, wherein said at least one instruction conveys at least one URL address indicating the address of a source of unstructured digitized data, each URL address being in a form such that a machine can access the source and import the unstructured digitized data from the source.

26. A computer readable storage medium as defined in claim 25, wherein said plurality of sources of unstructured digitized data are pages of the World Wide Web (WWW), each URL address indicating the address of a page of the WWW potentially including at least one connection to a different page of the WWW.

27. A computer readable storage medium as defined in claim 25, wherein said processing unit performs lexical analysis and text interpretation operations for identifying information elements relevant to the specific information in each source of unstructured digitized data.

28. A computer readable storage medium as defined in claim 27, wherein the lexical analysis and text interpretation operations are performed by said processing unit at least in part on the basis of a plurality of dictionaries.

29. A computer readable storage medium as defined in claim 27, wherein, for each source of unstructured digitized data where information elements have been identified, said processing unit is operative to establish relationships between the identified information elements at least in part on the basis of predetermined clustering rules, for assembling the identified information elements into coherent information relevant to the specific information.

30. A computer readable storage medium as defined in claim 29, wherein said processing unit is operative to process said coherent information generated from all of the sources of unstructured digitized data in which information elements relevant to the specific information were identified, for removing repetitive information and combining complementary information.

31. A computer readable storage medium as defined in claim 23, wherein said processing unit generates a data structure holding the specific information, said output signal including the data structure.

32. A computer readable storage medium as defined in claim 31, wherein said data structure is a list.

33. A computer readable storage medium as defined in claim 31, wherein said data structure is a table.

34. A computer readable storage medium as defined in claim 23, wherein each source of unstructured digitized data is selected from the group consisting of a WWW page, a database, a server, a memory module, a text file and a digitized document.

35. A computer readable storage medium as defined in claim 23, wherein the specific information is business information.

36. A computer readable storage medium as defined in claim 35, wherein the specific information is contact information for prospecting potential clients.

37. A computer readable storage medium as defined in claim 36, wherein the information elements relevant to the contact information are selected from the group consisting of business name, business description, telephone number, fax number, postal address, street name, city, country, region, postal code, e-mail address, name of a contact person and title of a contact person.

38. A data processing device for collecting specific information from several sources of unstructured digitized data, said data processing device comprising:
   a) an input for receiving at least one instruction governing the collection of the specific information;
   b) an identification unit coupled to said input, said identification unit operative to:
      i) establish a data connection with a plurality of sources of unstructured digitized data from which the specific information is to be collected, at least in part on the basis of the at least one instruction;
      ii) analyse the contents of each one of said plurality of sources of unstructured digitized data to identify information elements relevant to the specific information;
   c) an extractor unit operative to extract the identified information elements from each source of unstructured digitized data where information elements have been identified;
   d) an aggregator unit operative to process the extracted information elements for generating an output signal conveying at least a portion of the specific information, said processing including:
      for each source of unstructured digitized data, correlating the information elements extracted therefrom on the basis of predetermined clustering rules for assembling the extracted information elements into coherent information relevant to the specific information;
      compiling the coherent information assembled from the plurality of sources of unstructured digitized data into said at least a portion of the specific information; and
      discarding redundant information from said at least a portion of the specific information;
   e) an output for releasing said output signal from said data processing device.

39. A data processing device as defined in claim 38, wherein said at least one instruction conveys at least one location where the collection of the specific information is to take place.

40. A data processing device as defined in claim 39, wherein said at least one instruction conveys at least one URL address indicating the address of a source of unstructured digitized data, each URL address being in a form such that a machine can access the source and import the unstructured digitized data from the source.

41. A data processing device as defined in claim 40, wherein said plurality of sources of unstructured digitized data are pages of the World Wide Web (WWW), each URL address indicating the address of a page of the WWW potentially including at least one connection to a different page of the WWW.

42. A data processing device as defined in claim 40, wherein said identification unit performs lexical analysis and text interpretation operations for identifying information elements relevant to the specific information in each source of unstructured digitized data.

43. A data processing device as defined in claim 42, wherein the lexical analysis and text interpretation operations are performed by said identification unit at least in part on the basis of a plurality of dictionaries.

44. A data processing device as defined in claim 42, wherein, for each source of unstructured digitized data from which identified information elements have been extracted by said extraction unit, said aggregator unit is operative to establish relationships between the extracted information elements at least in part on the basis of predetermined clustering rules, for assembling the identified information elements into coherent information relevant to the specific information.

45. A data processing device as defined in claim 44, wherein said aggregator unit is operative to process said coherent information generated from all of the sources of unstructured digitized data where information elements relevant to the specific information were identified and extracted, for removing repetitive information and combining complementary information.

46. A data processing device as defined in claim 38, wherein said aggregator unit generates a data structure holding the specific information, said output signal including the data structure.

47. A data processing device as defined in claim 46, wherein said data structure is a list.

48. A data processing device as defined in claim 46, wherein said data structure is a table.

49. A data processing device as defined in claim 38, wherein each source of unstructured digitized data is selected from the group consisting of a WWW page, a database, a server, a memory module, a text file and a digitized document.

50. A data processing device as defined in claim 38, wherein the specific information is business information.

51. A data processing device as defined in claim 50, wherein the specific information is contact information for prospecting potential clients.

52. A data processing device as defined in claim 51, wherein the information elements relevant to the contact information are selected from the group consisting of business name, business description, telephone number, fax number, postal address, street name, city, country, region, postal code, e-mail address, name of a contact person and title of a contact person.

53. A method for collecting specific information from several sources of unstructured digitized data, said method comprising:
   a) receiving at least one instruction governing the collection of the specific information;
   b) establishing a data connection with a plurality of sources of unstructured digitized data from which the specific information is to be collected, at least in part on the basis of the at least one instruction;
   c) analyzing the contents of each one of the plurality of sources of unstructured digitized data to identify information elements relevant to the specific information;
   d) extracting the identified information elements from each source of unstructured digitized data where information elements have been identified;
   e) processing the extracted information elements for generating an output signal conveying at least a portion of the specific information, said processing including:
      for each source of unstructured digitized data, correlating the information elements extracted therefrom on the basis of predetermined clustering rules for assembling the extracted information elements into coherent information relevant to the specific information;
      compiling the coherent information assembled from the plurality of sources of unstructured digitized data into said at least a portion of the specific information; and
      discarding redundant information from said at least a portion of the specific information.

* * * * *